May 1, 1934.  H. IRMSCHER  1,956,901

TAGGING MACHINE

Filed Feb. 20, 1932  5 Sheets-Sheet 1

INVENTOR
HANS IRMSCHER
BY
ATTORNEYS

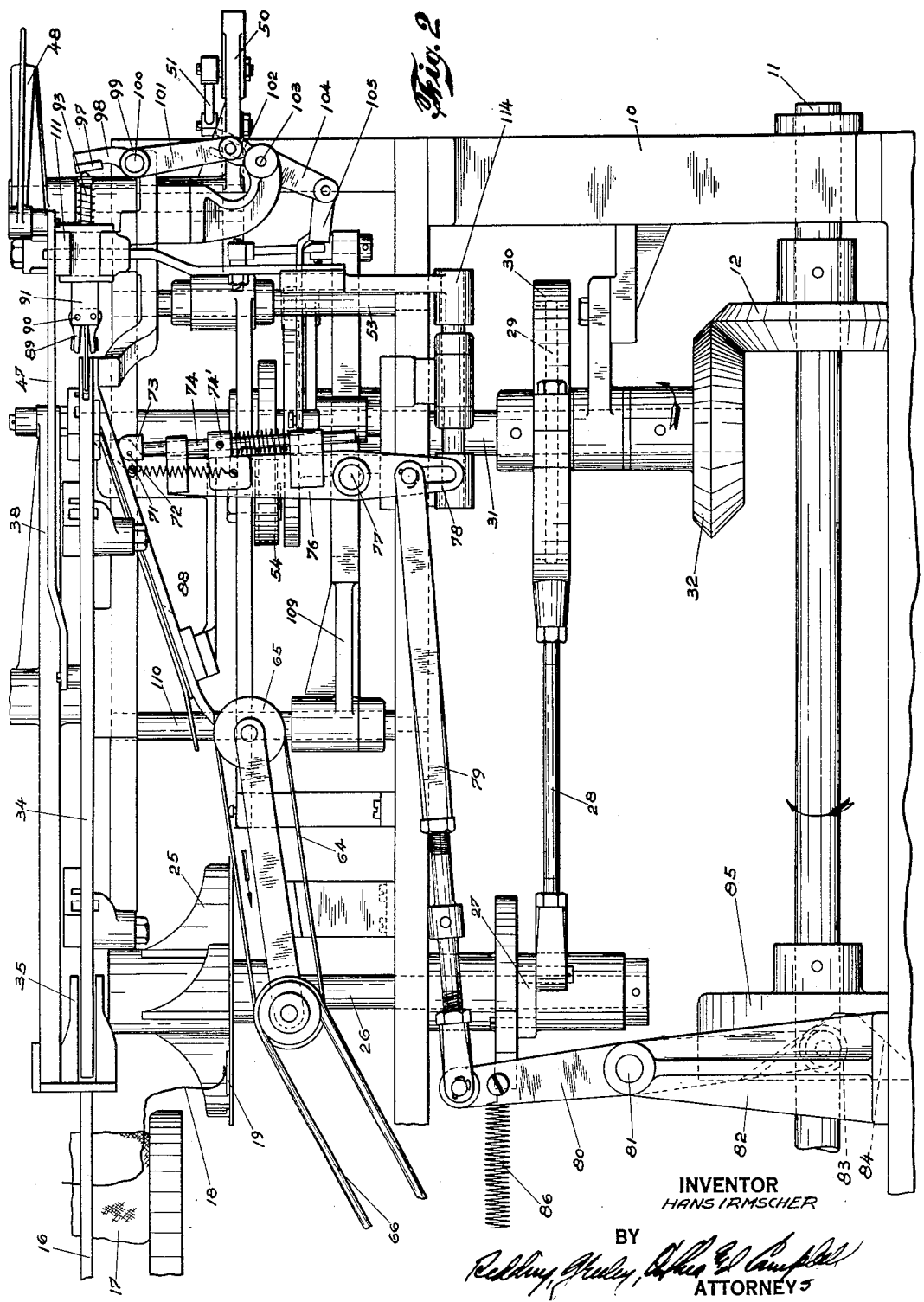

May 1, 1934.  H. IRMSCHER  1,956,901
TAGGING MACHINE
Filed Feb. 20, 1932   5 Sheets-Sheet 3
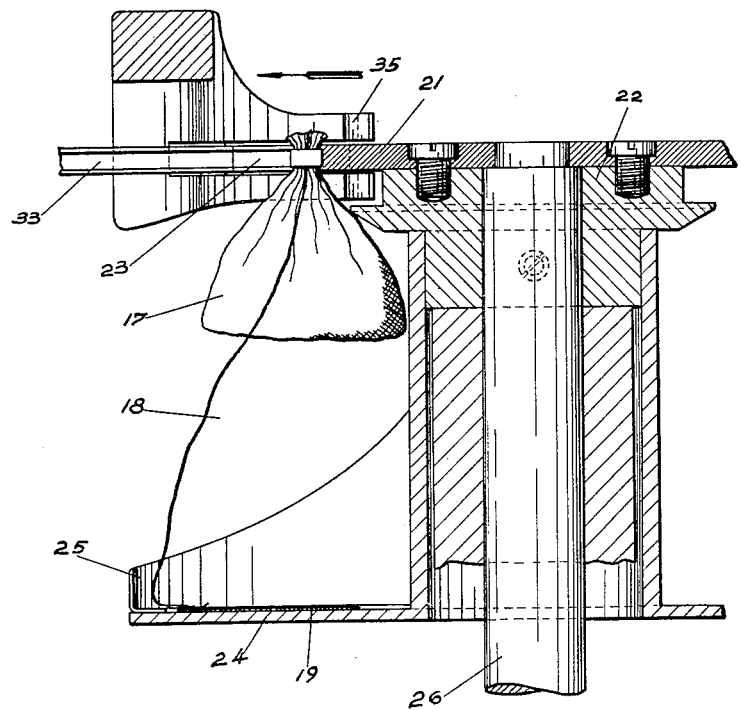
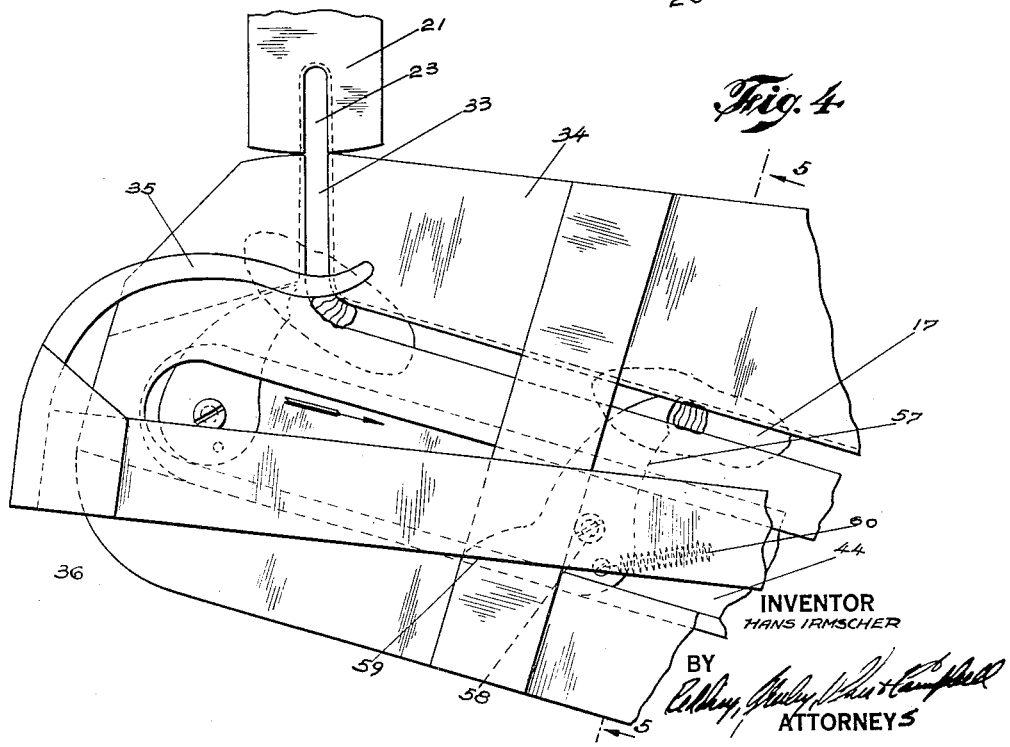
INVENTOR
HANS IRMSCHER
BY
ATTORNEYS May 1, 1934.    H. IRMSCHER    1,956,901
TAGGING MACHINE
Filed Feb. 20, 1932    5 Sheets-Sheet 4
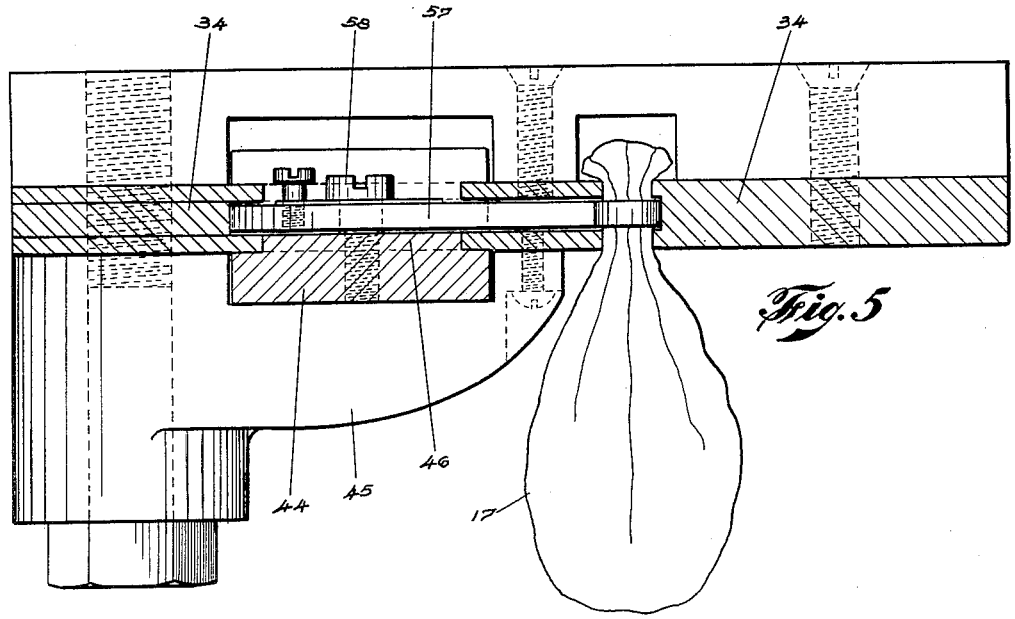
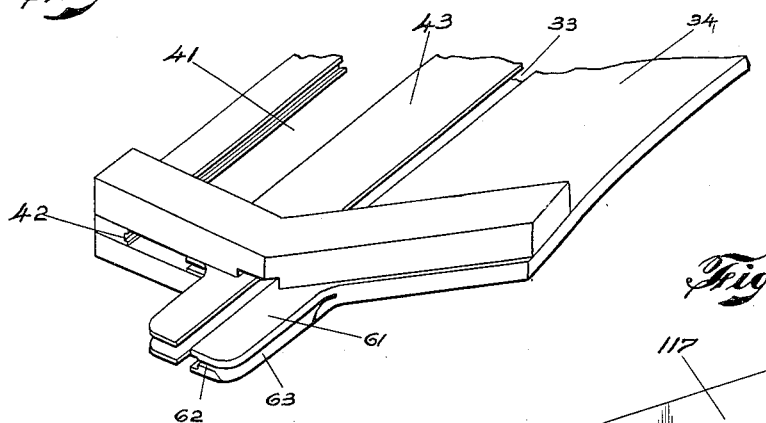
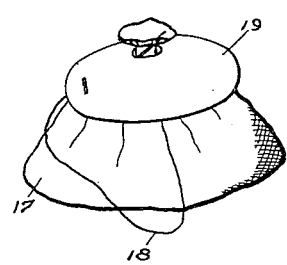
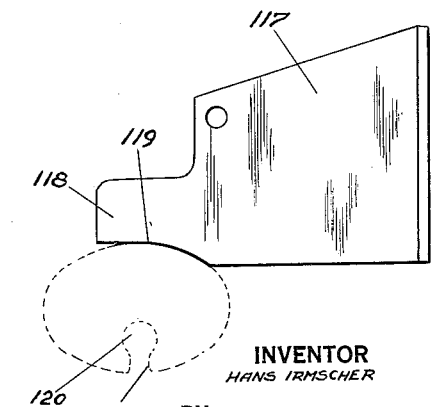
INVENTOR
HANS IRMSCHER
BY
ATTORNEYS

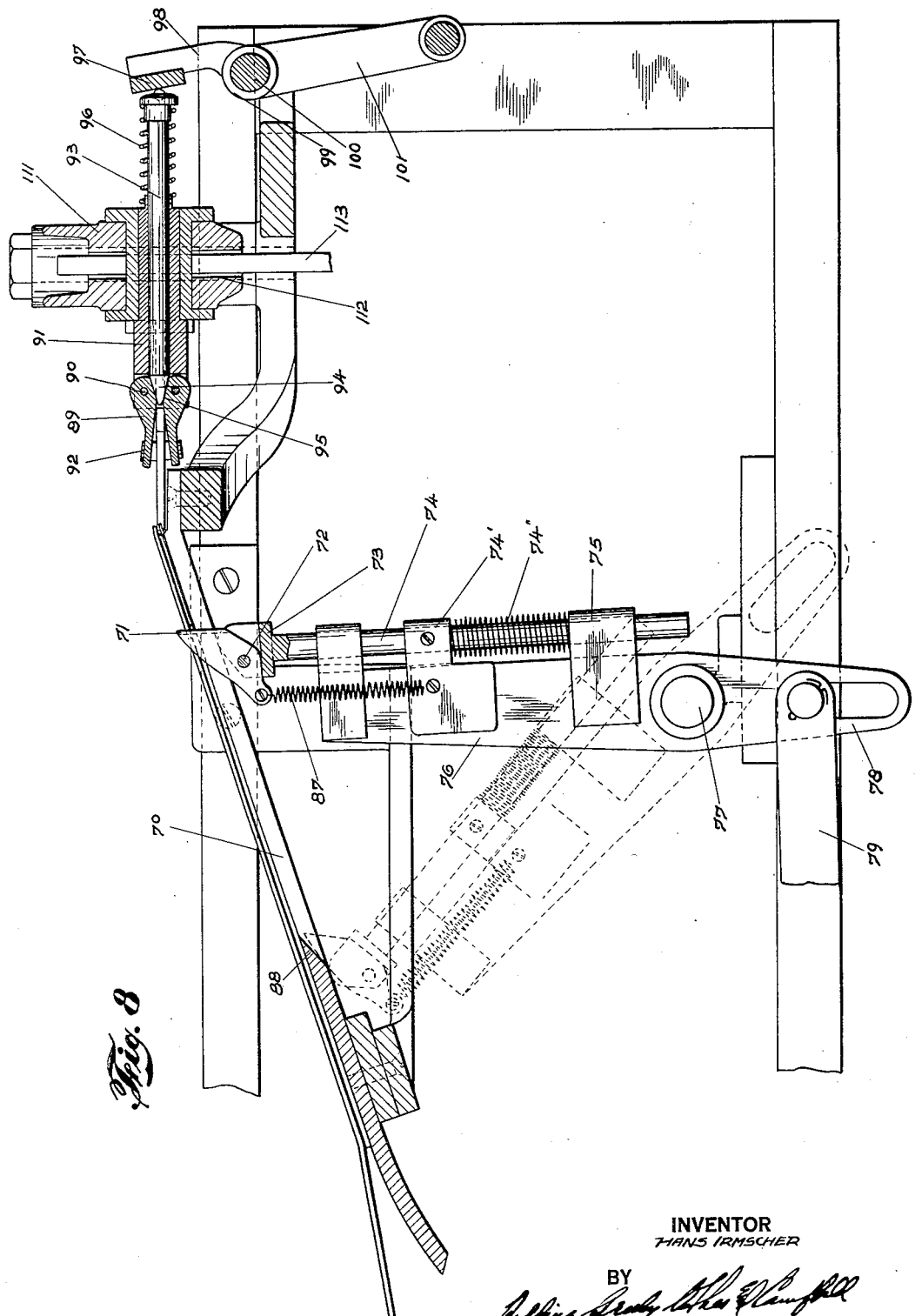

Patented May 1, 1934

1,956,901

UNITED STATES PATENT OFFICE 1,956,901

TAGGING MACHINE

Hans Irmscher, New York, N. Y., assignor to Millie Patent Holding Co., Inc., New York, N. Y., a corporation of New York Application February 20, 1932, Serial No. 594,195

21 Claims. (Cl. 226—56)

The present invention relates to devices for tagging articles and embodies, more specifically, a machine for applying tags or labels to previously formed and filled bags containing substances, such as tea, coffee, etc. from which an essence is to be extracted. More particularly, the invention embodies an improved machine by means of which a tag may be applied to a suitably formed bag or article at the end of a length of string, the tag being so applied that it is removably applied directly to the bag in addition to being permanently secured thereto through a length of string or other flexible material.

While, to facilitate the description of this machine, it will be referred to as a machine for applying tags to tea bags, it will be understood that any article may be handled by the machine to which it is desired to secure a tag. Furthermore, the invention is not to be limited to the specific substance which may be inserted in the bags which the machine handles in the event that the articles handled are bags.

Machines for forming and filling tea bags have heretofore been designed and are in extensive use. As is well known, these machines form bags of suitable sizes, fill them with a substance such as tea, close the bags and attach labels or tags thereto through suitable lengths of string. In handling the bags so formed, the string and bags frequently become tangled and inconvenience results in separating the bags as it is desired to use them.

In order to overcome the foregoing difficulties, the present invention proposes to apply tags removably to the bags, the applying thereof being in such fashion that the tags are temporarily applied directly to the respective bags, leaving the length of string by means of which they are permanently attached to the bags, until such time as it is desired to use the bags, hanging free about the bags. In as much as the tags are applied directly to the respective bags, the tendency for the tags and strings to become tangled is greatly reduced and the resulting product is far more convenient to use.

An object of the invention, accordingly, is to provide a machine for applying tags to bags with suitable lengths of string or the like, the tags being applied in such fashion that the tendency thereof to become tangled with the strings is accordingly reduced.

A further object of the invention is to provide a tagging machine by means of which tags are attached to bags through suitable lengths of string, additional means being provided for temporarily applying the tags directly to the bags.

A further object of the invention is to provide a tagging machine wherein bags which are formed with necks in effecting the closing thereof have strings attached to the necks, the machine including means for applying tags, which are at the ends of the strings, directly to the necks of the bags.

A further object of the invention is to provide a machine by means of which bags which are provided with rings to effect the closure thereof, have attached thereto lengths of strings, at the ends of which tags are secured, the machine additionally having means to apply the tags removably to the necks.

A further object of the invention is to provide a machine for attaching tags to bags wherein a continuous supply of tags at the ends of lengths of string is provided, the machine attaching the strings to the bags and subsequently conveying each bag and its respective tags separately to a device for applying the tag removably to its respective bag.

A further object of the invention is to provide means for conveying separately a bag and a tag attached thereto through a length of string to a means for removably applying the tag to the bag, such conveying means including a device for preventing the temporary application of a tag to a bag without an additional permanent attachment of the tag to such bag by means of a string.

A further object of the invention is to provide a machine for attaching tags to bags wherein a suitably formed tag is attached to a bag through a length of string, the travel of the tag from such operation to a subsequent additional applying operation being controlled in such fashion that the tag is always preserved in a definite relation to the bag, thus insuring the effective application of the tag removably to the bag.

Further objects, not specifically enumerated above, will be apparent as the invention is described in greater detail in connection with the accompanying drawings, wherein:

Figure 2 is a view in side elevation, showing the elements of Figure 1, and the driving means therefor.

Figure 3 is a view in section, taken on line 3—3 of Figure 1, and looking in the direction of the arrows, this view showing the rotatable table for supporting a bag and a tag which has been attached thereto through a suitable length of string, means also being shown for removing the bag from the table.

Figure 4 is a plan view of the elements shown in Figure 3, this figure also showing a stationary table along which the bags are conveyed to a device for applying the respective tags thereto removably.

Figure 5 is a view in section, taken on line 5—5 of Figure 4, and looking in the direction of the arrows.

Figure 6 is a detail view in isometric projection showing the stationary table along which the bags are moved.

Figure 7 is a detail view in isometric projection showing a bag to which a tag has been applied in accordance with the present invention.

Figure 8 is a detail view in side elevation showing a means for temporarily and removably applying a tag to a bag.

Figure 9 is a plan view illustrating the mechanism for moving a tag into engagement with a bag to cause the same to be removably applied thereto.

Figure 1:
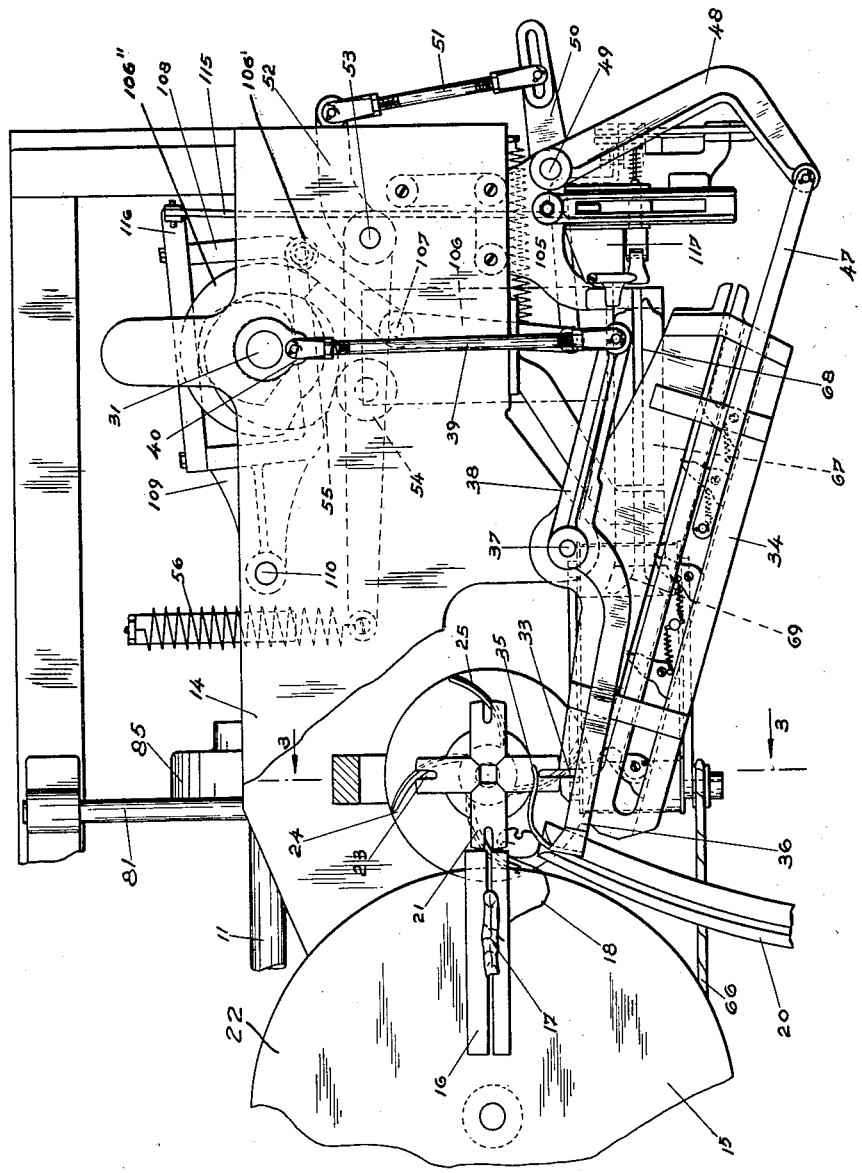
Figure 1 is a plan view of a machine constructed in accordance with the present invention, wherein means is provided for attaching tags to bags through suitable lengths of string, such machine being provided with means to apply the tags to the respective bags removably in a subsequent operation.

With particular reference to Figures 1 and 2, the frame of a machine is shown at 10 and is provided with a power shaft 11 upon which a bevel gear 12 is secured. The machine is provided with a bed 14 upon which a horizontal table 15 is rotatably mounted. Table 15 may be provided with means 16 for supporting a bag with the open end thereof closed as illustrated in the upper left hand corner of Figure 2 and the left hand portion of Figure 1. The supporting means 16 is adapted to receive a bag 17 as well as a string 18 which is to be secured to the bag in a closing operation in accordance with existing practice. The strings 18 have tags 19 secured to the free ends thereof, such strings and tags being fed from a chute 20 in accordance with well known practice.

The foregoing mechanism is shown and described in detail in the United States Patent to Allatt, Reissue No. 16,897 dated March 13, 1927, and assigned to the assignee of the present application.

From the supporting means 16, the bags are moved successively into the arms 21 of a rotatable member 22, the arms 21 being formed with recesses 23 into which the open end of the bag and string are crimped and closed. In as much as this operation follows existing practice, a detailed description thereof is not believed necessary herein.

Rotatably mounted with member 22 is a tag table 24, the table being rotated in a clockwise direction as viewed in Figure 1. Guides 25, equal in number to the arms 21, are formed on the table and curve away from the direction of rotation as seen in Figure 1. These guides provide separated ledges or platforms upon which the tags 19 are received. Table 24 and member 22 are rotated intermittently by means of a shaft 26 which has secured thereto a ratchet and pawl device 27, the same being operated by a link 28 which is reciprocated by an eccentric 29 and an eccentric strap 30. Eccentric 29 is secured to a vertical rotatable shaft 31 which has mounted thereon a bevel gear 32 which engages with bevel gear 12 upon driving shaft 11.

As bags are received in the arms 21 from the supporting means 16, the corresponding tag which is attached to each bag is received upon the proper shelf or ledge of table 24. After moving, by three successive stages, through 270°, each bag is positioned at the entrance of a groove 33, formed in a stationary table 34. As a bag comes to rest at the opening of groove 33, a bifurcated finger 35 moves toward the table 34 and positions the bag within the groove 33. The finger 35 is mounted upon the extremity of an arm 36 which is pivoted at 37 and provided with a crank arm 38 to which a link 39 is connected. Link 39 is reciprocated by a driving crank 40 which is secured to shaft 31. Reciprocation of link 39 thus causes finger 35 to remove the bags from the respective arms 21, the arms 21 moving between the bifurcations of finger 35.

Stationary table 34 is formed with a guide groove 41 in addition to the bag receiving groove 33. As seen in Figures 4, 5 and 6, the guide groove 41 is formed with a groove 42 at one side, and vertically spaced plates 43 at the other. Beneath groove 41 a head 44 is mounted, the head being slidably supported upon brackets 45 and formed with a longitudinal rib 46 which is received between the sides of groove 41. Head 44 is reciprocated beneath the groove by means of a link 47 which is pivoted to the head and at the other end, to a bell crank arm 48 which is pivoted at 49 and formed with a driving arm 50. Arm 50 is actuated by a link 51 which is connected to a lever 52 which is pivoted at 53 to the frame of the machine. A roller 54 is mounted upon lever 52 and engages a cam 55 which is mounted upon shaft 31. A spring 56 normally urges the roller 54 against cam 55 and rotation of shaft 31 thus effects the reciprocation of head 44.

Upon the longitudinal rib 46, a plurality of detents 57 are mounted. Detents 57 are pivoted upon rib 44 at 58 and are formed with shoulders 59 which limit the counterclockwise movement of the detents, as viewed in Figure 4, about the respective pivots 58. Springs 60 normally urge the detents 57 in a counterclockwise direction and the ends of the detents project between the spaced plates 43 and into the groove 33. Upon movement of head 44 to the left, as viewed in Figure 4, the ends of the detents pass over the bags within groove 33 and are positioned upon the left hand side thereof, as illustrated in Figure 4. Upon movement of the head 44 toward the right, as viewed in Figure 4, the respective bags will be advanced along the groove 33 and ultimately reach the mouth thereof.

The outer end of the groove is formed by spaced extensions of the plates 43 and an extension 61 of the table. Extension 61 is formed with a horizontal slot 62, the lower wall of which is formed with a curved entrance surface 63. As the last detent upon head 44 moves a bag into the outer extremity of slot 33 a tag is applied to the neck of the bag as seen in Figure 7.

In order that a tag may be properly positioned to be automatically advanced into engagement with the neck of its bag, movement thereof with respect to its bag must be carefully controlled. As the bags are removed from the arms 21, the respective tags are drawn from the ledges upon table 24 and moved over an endless belt 64. Belt 64 is mounted over pulleys 65 and driven by means of a belt 66 which engages a groove upon one of the pulleys. To avoid applying a tag to a bag in the event that its string connection thereto has been severed or impaired, the belt 64 is driven in the direction indicated by the arrow of Figure 2. Should a tag be placed upon the belt when not properly secured to a bag, it is moved toward the left and discharged without being advanced into the securing mechanism described hereinafter.

As the bags are moved along groove 33, the respective tags will be advanced over belt 64 and received within a guide 67 which is formed with a groove 68 in the upper surface thereof to receive the strings which connect the tags to their respective bags. Groove 68 is formed with an outwardly flaring mouth 69 to insure the entrance of the strings thereinto and, between the mouth of the guide and its outlet, the guide is formed with a groove 70 which is adapted to receive a detent 71 for advancing the tags successively through the guide.

Detent 71 is pivoted at 72 upon a head 73, head 73 being mounted upon a rod 74 which is slidably mounted at 75 in an arm 76. A collar 74 is secured to rod 74' and spring 74'' normally urges the rod 74 in the direction of the guide 67. Arm 76 is pivoted at 77 and formed with a driving arm 78 to which a link 79 is connected. Link 79 is connected to a lever 80 which is journaled at 81 upon brackets 82, the lower extremity of lever 80 being provided with a roller 83 which engages a cam track 84 formed upon a collar 85 which is secured to the driving shaft 11. A spring 86 normally urges roller 83 against the cam track and thus causes the rotation of shaft 11 to reciprocate the arm 76. A spring 87 normally urges the detent 71 into the position shown in Figure 8 and the left hand extremity 88 of groove 70 serves as a cam to depress detent 71 and permit a tag to be moved thereover through the guide 67. After the tags have been moved over the detent, the latter is guided to advance the tags progressively into the position shown in Figure 8.

From the guide 67, the tags are moved into engagement with the respective bags to be applied thereto. Such movement is effected by means of jaws 89 which are pivoted at 90 upon a head 91. Springs 92 serve to urge the jaws normally into a closed position and the opening of the jaws is effected by means of a plunger 93 which is formed with a nose 94 adapted to be moved between cam surfaces 95 on the jaws 89 to separate the same. The rod 93 is moved to a retracted position by means of a spring 96, movement thereof in the opposite direction being effected positively by means of a rail 97 which is mounted upon spaced arms 98, the arms being formed upon a sleeve 99 which is journaled at 100. Sleeve 99 is provided with an arm 101 which is engaged by a bifurcated lever 102 which is journaled at 103. The lever 102 is formed with an arm 104 which is connected to a link 105, the link 105 being pivoted to a lever 106 which is pivoted at 107 to the frame of the machine. The other extremity of lever 106 is provided with a roller 106' which engages a cooperating cam 106'' upon shaft 31.

Head 91 is slidably mounted in a stationary guide 111 which is formed with a slot 112. Slot 112 receives a driving arm 113 which is pivoted at 114 and has connected thereto a link 115. The other end of link 115 is connected to an extension 116 of a cam box 108 and the head 91 is thus reciprocated in guide 11. Cam box 108 may be formed upon an arm 109 which is pivoted at 110. A plate 117 is formed on the head 91 and provided with a backing member 118 formed with a curved surface 119 against which the tags are adapted to seat as indicated in dotted lines in Figure 9.

As the tags emerge from the guides 67, the jaws are opened to receive them, the jaws being closed as soon as the tags are moved in front of the backing member 118. Head 91 is then advanced toward the outlet of groove 33 and the tag is thus moved through the longitudinal slot 62 and into engagement with the neck of its bag. In order that the tag may be retained more effectively upon its bag, the tag is preferably formed with a notch 120 which is provided with a restricted entrance 121. The sides of the restricted entrance 121 are thus flexed as the tag is moved into engagement with the neck of the bag and the tag is applied in the position shown in Figure 7.

While the invention has been described with specific reference to the accompanying drawings, it is not to be limited, save as defined in the appended claims.

I claim as my invention:

1. A device for applying tags to receptacles to which the tags have been secured by lengths of a flexible element comprising means to hold a receptacle, means to hold a tag which has been secured thereto by a length of a flexible element, and means to apply removably the tag directly to the receptacle.

2. A device for applying tags to bags having a closure adjacent the mouth thereof comprising means to hold the receptacle, means to hold a tag which has been secured by a length of a flexible element secured under the closure and means to apply removably a tag directly over the bag closure.

3. In combination with means for attaching a string to a receptacle, said string having a tag at the end thereof, of means to apply removably the tag directly to the receptacle.

4. In combination with means for attaching a string to a closure for a bag, said string having a tag at the end thereof, a bag holding means, and means to move the tag into engagement with the bag and secure the same removably thereto.

5. In combination with means for attaching a string to a closure for a bag, said string having a tag at the end thereof, a bag holding means, means to move the bag from the attaching means to the holding means, and means to move the tag into engagement with the bag and secure the same removably thereto.

6. In combination with means for attaching a string to a closure for a bag, said string having a tag at the end thereof, a bag holding means, means to move the bag from the attaching means to the holding means, means to move the tag into engagement with the bag and secure the same removably thereto, and means to move the tag to the last named moving means.

7. In combination with means for attaching a string to a closure for a bag, said string having a tag at the end thereof, a bag holding means, means to move the bag from the attaching means to the holding means, means to move the tag into engagement with the bag, means to move the tag to the last named moving means, and means to urge the tag away from the last named means during its movement from the attaching means thereto.

8. In combination with means for attaching a string to a closure for a bag forming a neck therein, said string having a tag at the end thereof, a bag holding means, means to move the bag from the attaching means to the holding means, means to move the tag into engagement with the neck of the bag, means to move the tag to the last named moving means, and a moving surface onto which the tag passes in its movement from the attaching means to the last named means, said surface moving away from the last named moving means.

9. In combination with means for attaching a string to a closure for a bag forming a neck therein, said string having a tag at the end thereof, a bag holding means, means to move the bag from the attaching means to the holding means, means to move the tag into engagement with the neck of the bag, means to move the tag to the last named moving means, means to guide the tag to the last named means, an endless belt onto which the tag is moved, and means to move the belt in a direction opposite to that in which the tag moves.

10. A rotatable member carrying bag receiving arms in which strings are secured under bag closing means, a table below the arms rotatable therewith and formed with a number of shelves equal to the number of arms for receiving the tags of the bags held in the respective arms, a bag holding means, means to move a tag to the bag holding means, and means to move a bag and its tag simultaneously to the bag holding means and tag moving means respectively.

11. A rotatable member carrying bag receiving arms in which strings are secured under bag closing means, a table below the arms rotatable therewith and formed with a number of shelves equal to the number of arms for receiving the tags of the bags held in the respective arms, a bag holding means, means to move a tag to the bag holding means, means to move a bag to the bag holding means, and means to direct a tag to the tag moving means.

12. A rotatable member carrying bag receiving arms in which strings are secured under bag closing means, a table below the arms rotatable therewith and formed with a number of shelves equal to the number of arms for receiving the tags of the bags held in the respective arms, a bag holding means, means to move a tag to the bag holding means, means to move a bag to the bag holding means, and means to direct a tag to the tag moving means, said last named means including a surface moving in a direction opposite to the direction of movement of a tag.

13. A rotatable member carrying bag receiving arms in which strings are secured under bag closing means, a table below the arms rotatable therewith and formed with a number of shelves equal to the number of arms for receiving the tags of the bags held in the respective arms, a bag holding means, means to move a tag to the bag holding means, means to move a bag to the bag holding means, a guide to direct a tag to the tag moving means, an endless belt to direct a tag from the table to the guide, and means to move the belt in a direction opposite to the movement of the tag to the guide.

14. A rotatable member carrying bag receiving arms in which strings are secured under bag closing means, a table below the arms rotatable therewith and formed with a number of shelves equal to the number of arms for receiving the tags of the bags held in the respective arms, a bag holding means, means to move a bag to the bag holding means, and means to grip a tag and move the same into engagement with its bag.

15. A rotatable member carrying bag receiving arms in which strings are secured under bag closing means, a table below the arms rotatable therewith and formed with a number of shelves equal to the number of arms for receiving the tags of the bags held in the respective arms, a bag holding means, means to move a bag to the bag holding means, means to grip a tag and move the same into engagement with its bag, and a guide to direct a tag to the gripping means.

16. A rotatable member carrying bag receiving arms in which strings are secured under bag closing means, a table below the arms rotatable therewith and formed with a number of shelves equal to the number of arms for receiving the tags of the bags held in the respective arms, a bag holding means, means to move a bag to the bag holding means, means to grip a tag and move the same into engagement with its bag, a backing for the tag to force the same into engagement with the bag, and a guide to direct a tag to the gripping means.

17. A rotatable member carrying bag receiving arms in which strings are secured under bag closing means, a table below the arms rotatable therewith and formed with a number of shelves equal to the number of arms for receiving the tags of the bags held in the respective arms, a plate formed with a guide groove to receive the bags, means to position the bags at the end of the groove, and means to move a tag into engagement with a bag.

18. A rotatable member carrying bag receiving arms in which strings are secured under bag closing means, a table below the arms rotatable therewith and formed with a number of shelves equal to the number of arms for receiving the tags of the bags held in the respective arms, a plate formed with a guide groove to receive the bags, means to position the bags at the end of the groove, means to move the bags through the groove to the positioning means, and means to move a tag into engagement with a bag.

19. A rotatable member carrying bag receiving arms in which strings are secured under bag closing means, a table below the arms rotated therewith and formed with a number of shelves equal to the number of arms for receiving the tags of the bags held in the respective arms, a plate formed with a guide groove to receive the bags, means to position the bags at the end of the groove, a plurality of spring pressed detents to engage bags in the groove and move the same to the positioning means, and means to move a tag into engagement with a bag.

20. A rotatable member carrying bag receiving arms in which strings are secured under bag closing means, a table below the arms rotatable therewith and formed with a number or shelves equal to the number of arms for receiving the tags of the bags held in the respective arms, a plate formed with a guide groove to receive the bags, means to position the bags at the end of the groove, a plurality of spring pressed detents to engage bags in the groove and move the same to the positioning means, means to move the detents simultaneously, and means to move a tag into engagement with a bag.

21. A rotatable member carrying bag receiving arms in which strings are secured under bag closing means, a table below the arms rotatable therewith and formed with a number of shelves equal to the number of arms for receiving the tags of the bags held in the respective arms, a plate formed with a guide groove to retain the bags, means to position the bags at the end of the groove, a guide groove parallel to the first groove and spaced therefrom by parallel plates, a head slidable in the second groove, spring pressed detents on the head and extending between the parallel plates into the first groove, means to reciprocate the head, and means to move a tag into engagement with a bag.

HANS IRMSCHER.